United States Patent
Fumarolo

(10) Patent No.: US 9,301,133 B2
(45) Date of Patent: Mar. 29, 2016

(54) AUDIO SUMMING SYSTEMS AND METHODS IN RADIO COMMUNICATION SYSTEMS

(71) Applicant: MOTOROLA SOLUTIONS, INC, Schaumburg, IL (US)

(72) Inventor: Arthur L Fumarolo, Schaumburg, IL (US)

(73) Assignee: MOTOROLA SOLUTIONS, INC., Schaumburg, IL (US)

(*) Notice: Subject to any disclaimer, the term of this patent is extended or adjusted under 35 U.S.C. 154(b) by 156 days.

(21) Appl. No.: 14/263,352

(22) Filed: Apr. 28, 2014

(65) Prior Publication Data

US 2015/0312755 A1 Oct. 29, 2015

(51) Int. Cl.
*H04L 9/00* (2006.01)
*H04W 12/04* (2009.01)
*H04L 9/08* (2006.01)

(52) U.S. Cl.
CPC .............. *H04W 12/04* (2013.01); *H04L 9/0816* (2013.01); *H04L 2209/24* (2013.01); *H04L 2209/80* (2013.01)

(58) Field of Classification Search
CPC combination set(s) only.
See application file for complete search history.

(56) References Cited

U.S. PATENT DOCUMENTS

| 5,353,351 | A | 10/1994 | Bartoli | |
|---|---|---|---|---|
| 5,365,590 | A | 11/1994 | Brame | |
| 8,588,144 | B2 | 11/2013 | Nabar | |
| 8,953,801 | B2* | 2/2015 | Thomasson | H04L 63/0428 380/255 |
| 9,154,471 | B2* | 10/2015 | Crolley | H04L 63/0428 |
| 2009/0080653 | A1* | 3/2009 | Candelore | H04N 7/162 380/200 |
| 2014/0010368 | A1* | 1/2014 | Ohhira | H04W 12/08 380/270 |

* cited by examiner

*Primary Examiner* — Beemnet Dada

(57) ABSTRACT

A method, a device, and a communication system include receiving one or more concurrent transmissions from one or more source devices in the communication system; responsive to the one or more concurrent transmissions comprising a single source transmission from a single source device, retransmitting the single source transmission either clear or encrypted based on the single source transmission; responsive to the one or more concurrent transmissions comprising multiple transmissions from multiple source devices, performing one of: summing audio to create a summed resultant stream and broadcasting the summed resultant stream based on matching encryption parameters associated with each of the multiple transmissions; and broadcasting only a selected transmission of the one or more concurrent transmissions from a higher priority source device based on an encryption parameter mismatch between the multiple transmissions, wherein the selected transmission is broadcast based on encryption parameters associated with the selected transmission.

20 Claims, 3 Drawing Sheets

AUDIO SUMMING SYSTEMS AND METHODS IN RADIO COMMUNICATION SYSTEMS

BACKGROUND OF THE INVENTION

The present disclosure relates to radio communication systems, and in typical radio communication systems, only one user can speak to subscriber units on a given channel/talkgroup at any time. An exemplary radio communication system can include a dispatch system with a dispatch console and one or more subscriber units. Conventionally, the dispatch console has priority on a given channel/talkgroup, i.e., if both the dispatch console and a subscriber speak simultaneously, dispatch console users can hear both, but other subscriber units only hear the dispatch console. In conventional analog radio communication systems, there was a desire to allow two users to speak simultaneously, e.g., if both the dispatch console and a subscriber speak simultaneously, dispatch consoles hear both speakers, and the two transmitted audio signals are summed together and sent to other subscriber units so they can also hear both speak. Summing two audio signals in the analog domain is well known in the art. Further, radio communication systems are moving towards digital implementations. For example, digital radio communication systems can be easily encrypted to prevent eavesdropping which is advantageous in public safety dispatch systems (e.g., police, fire, etc.). While digital audio can be summed, issues arise if the two originating voice streams are encrypted using different encryption parameters, including encryption modes, algorithms, or keys. Broadcasting an originating audio stream in a summed digital audio stream using a non-originating audio stream encryption mode and/or key may allow non-intended users to hear the audio from the originating audio stream.

Accordingly, there is a need for audio summing systems and methods in radio communication systems.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
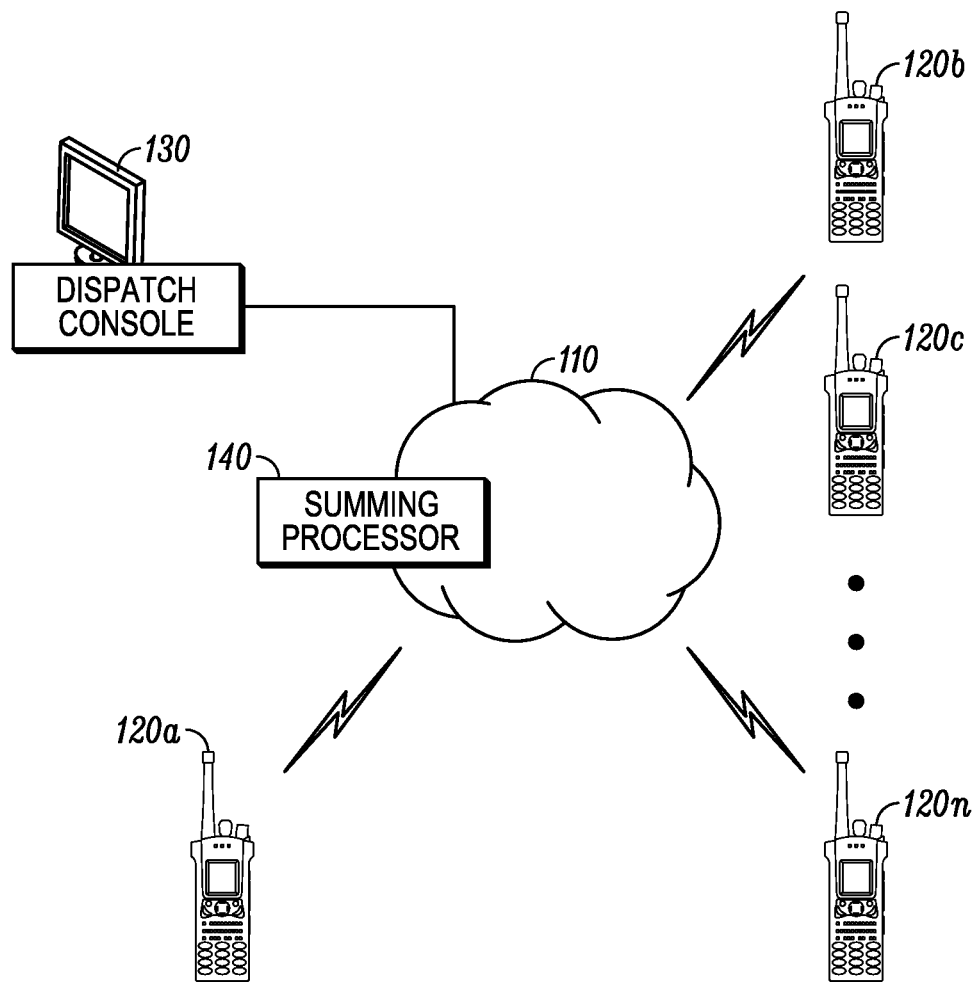
FIG. 1 is a network diagram of a radio communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method in a communication system includes receiving one or more concurrent transmissions from one or more source devices in the communication system; responsive to the one or more concurrent transmissions comprising a single source transmission from a single source device, retransmitting the single source transmission either clear or encrypted based on encryption parameters associated with the single source transmission; responsive to the one or more concurrent transmissions comprising multiple transmissions from multiple source devices, performing one of: summing audio from each of the multiple transmissions to create a summed resultant stream and broadcasting the summed resultant stream that is either clear or encrypted based on matching encryption parameters associated with each of the multiple transmissions; and broadcasting only a selected transmission of the one or more concurrent transmissions from a higher priority source device of the multiple source devices based on an encryption parameter mismatch between the multiple transmissions, wherein the selected transmission is broadcast either clear or encrypted based on encryption parameters associated with the selected transmission.

In another exemplary embodiment, a device in a communication system includes a network interface communicatively coupled to the communication system; a processor communicatively coupled to the network interface; and memory storing instructions that, when executed, cause the processor to: receive one or more concurrent transmissions from one or more sources via the network interface; responsive to the one or more concurrent transmissions comprising a single source transmission from a single source device, retransmit the single source transmission either clear or encrypted based on encryption parameters associated with the single source transmission; and responsive to the one or more concurrent transmissions comprising transmissions from multiple source devices, perform one of: sum audio from each of the multiple transmissions to create a summed resultant stream and broadcast the summed resultant stream that is either clear or encrypted based on matching encryption parameters associated with each of the multiple transmissions; and broadcast only a selected transmission of the one or more concurrent transmissions from a higher priority source device of the multiple source devices based on an encryption parameter mismatch between the multiple transmissions, wherein the selected transmission is broadcast either clear or encrypted based on encryption parameters associated with the selected transmission.

In yet another exemplary embodiment, a communication system includes a plurality of subscriber units; infrastructure communicatively coupled to the plurality of subscriber units; a console communicatively coupled to the infrastructure; and a device comprising a network interface communicatively coupled to the infrastructure, the console, a processor, and memory storing instructions that, when executed, cause the processor: receive a one or more concurrent transmissions from the console and/or a subscriber unit of the plurality of subscriber units; responsive to the one or more concurrent transmissions comprising a single source transmission from a single source device, retransmit the single source transmission either clear or encrypted based on encryption parameters associated with the single source transmission; and responsive to the one or more concurrent transmissions comprising multiple transmissions from multiple source devices, perform one of: sum audio from each of the multiple transmissions to create a summed resultant stream and broadcast the summed resultant stream that is either clear or encrypted based on matching encryption parameters associated with each of the multiple transmissions; and broadcast only a selected transmission of the one or more concurrent transmissions from a higher priority source device of the multiple source devices based on an encryption parameter mismatch between the multiple transmissions, wherein the selected transmission is broadcast either clear or encrypted based on encryption parameters associated with the selected transmission.

In various exemplary embodiments, audio summing systems and methods in radio communication systems are described. The audio summing systems and methods include various rules governing audio summing and use of encryption algorithms and keys ensuring audio is only heard by authorized subscribers who possess the appropriate encryption algorithms and keys needed to decrypt the summed audio.

FIG. 1 is a network diagram of a radio communication system 100 in accordance with some embodiments. The radio communication system 100 can be a wireless communication system. The radio communication system 100 includes an infrastructure 110 communicatively coupled to one or more subscriber units 120a, 120b, 102c, ..., 120n. The infrastructure 110 can include various repeaters, base stations, etc. The radio communication system 100 can be a digital radio system that utilizes any of Long Term Evolution (LTE), cellular/wireless telecommunication protocols (e.g. 3G/4G, etc.), Land Mobile Radio (LMR), Digital Mobile Radio (DMR), Terrestrial Trunked Radio (TETRA); Project 25 (P25), and the like. The radio communication system 100 can include one or more channels and/or talkgroups, and for illustration purposes, the subscriber units 120a-120n are assumed to be on a same channel/talkgroup.

In an exemplary embodiment, the radio communication system 100 can be a dispatch system and can include a dispatch console 130 communicatively coupled to the infrastructure 110 (e.g., wired and/or wireless connectivity). The dispatch console 130 can be considered a higher priority user or device, relative to other devices in the system. The summing processor 140 may be pre-configured with a list of identifiers of one or more higher priority devices, including a list of relative priorities, which may identify, for example, dispatch console 130 as a relatively higher priority source device.

The radio communication system 100 can be a half-duplex system where only one of the subscriber units 120a-120n or the dispatch console 130 are actively transmitting on the channel/talkgroup at a time. That is, the radio communication system 100 can be a push-to-talk (PTT) system or equivalent. However, the dispatch console 130 can be full-duplex in that the dispatch console 130 can communicate on the channel/talkgroup while simultaneously hearing a communicating subscriber unit 120a. However, the radio communication system 100 can perform audio summing such that when the dispatch console 130 and one of the subscriber units 120a-120n are simultaneously communicating, the other subscriber units 120a-120n can hear both parties. Still further, the radio communication system 100 can perform audio summing such that when multiple subscriber units 120a-120n transmit on different channels/talkgroups, the summed audio could then be broadcast on one or more channels/talkgroups.

In operation, one of the subscriber units 120a-120n, e.g., the subscriber unit 120a, can transmit on the channel/talkgroup of the radio communication system 100. This can be via PTT or the like. The subscriber unit 120a transmits its transmission to the infrastructure 110, which may then broadcast it to the other subscriber units 120b-120n and to the dispatch console 130. The dispatch console 130 can communicate on the channel/talkgroup by sending its transmission to the infrastructure 110 (e.g., via wired and/or wireless connectivity) and the infrastructure 110 broadcasts (e.g., wirelessly re-transmits via one or more fixed or mobile stations) the transmission to the subscriber units 120a-120n. Conventionally, if the subscriber unit 120a is transmitting and the dispatch console 130 is transmitting, the subscriber unit 120a is preempted in favor of the dispatch console 130, i.e., the infrastructure 110 provides the transmission of the subscriber unit 120a to the dispatch console 130, but only broadcasts the transmission of the dispatch console 130 to the other subscriber units 120b-120n.

In various exemplary embodiments, the radio communication system 100 is configured to provide audio summing systems and methods. Here, when the dispatch console 130 and the subscriber unit 120a transmit simultaneously, both transmissions are summed and provided, e.g., broadcast, by the infrastructure 110 to the other subscriber units 120b-120n. Again, the radio communication system 100 can be digital and can utilize various digital summing techniques for audio as are known in the art.

The radio communication system 100 includes encryption where encrypted transmissions amongst the various subscriber units 120a-120n and/or the dispatch console 130 can only be heard with the corresponding associated decryption parameters (e.g., mode, algorithm, and key,). This prevents eavesdropping by unauthorized third parties. The radio communication system 100 contemplates any encryption/decryption mode, technique, or method. With respect to encryption parameters in the radio communication system 100, there is an encryption mode, an encryption algorithm, and an encryption key. The encryption mode is encrypted or clear (i.e., non-encrypted). The encryption algorithm is the specific type of encryption being used when the encryption mode is encrypted, and the encryption key is the particular values needed to encrypt and/or decrypt a session in the encryption algorithm. The subscriber units 120a-120n and the dispatch console 130 can each include one or more keys (e.g., K1, K2, etc.) that enable encryption/decryption of a transmission and/or broadcast on the channel/talkgroup. For example, if a broadcast on the channel/talkgroup is encrypted with a key K1 and the subscriber unit 120b only has a key K2 or no key at all, the subscriber unit 120b is unable to decrypt the broadcast. Similarly, an eavesdropper without the key K1 cannot decrypt the broadcast. However, if the subscriber unit 120a has the key K1, the subscriber unit 120a can decrypt the broadcast.

In an exemplary embodiment, the radio communication system 100, using a same encryption algorithm, includes at least two keys, K1 and K2, although more keys or a single key, and/or additional encryption algorithms, are also contemplated. In this scenario, all of the subscriber units 120a-120n can have the key K1, i.e., a general key for all encrypted transmissions. A subset of the subscriber units, e.g., the subscriber units 120b, 120c can have the key K2, i.e., a private key for select transmissions. In a practical exemplary embodiment, the key K1 may be assigned to all police officers whereas the key K2 may be assigned to police officers in a select unit such as internal affairs. Of course, other embodiments are contemplated as well.

The audio summing systems and methods enable the audio summing to deal with encryption such that broadcasts are only heard by authorized users while allowing simultaneous transmissions from the subscriber unit 120a and the dispatch console 130 to be summed and subsequently broadcast. The audio summing systems and methods include various rules to deal with three distinct scenarios that can occur in the radio communication system 100, namely 1) a single transmitting source device, 2) multiple transmitting source devices and an encryption parameter match (mode, algorithm, and key) in a summed audio scenario, and 3) multiple transmitting source devices and an encryption parameter mismatch (mode, algorithm, and key). Again, the summed audio scenario is where the subscriber unit 120a and the dispatch console 130 are transmitting concurrently. The audio summing systems and methods ensure the proper encryption mode, algorithm and key are used in both the single audio source scenario and the summed audio scenarios.

Figure 2:
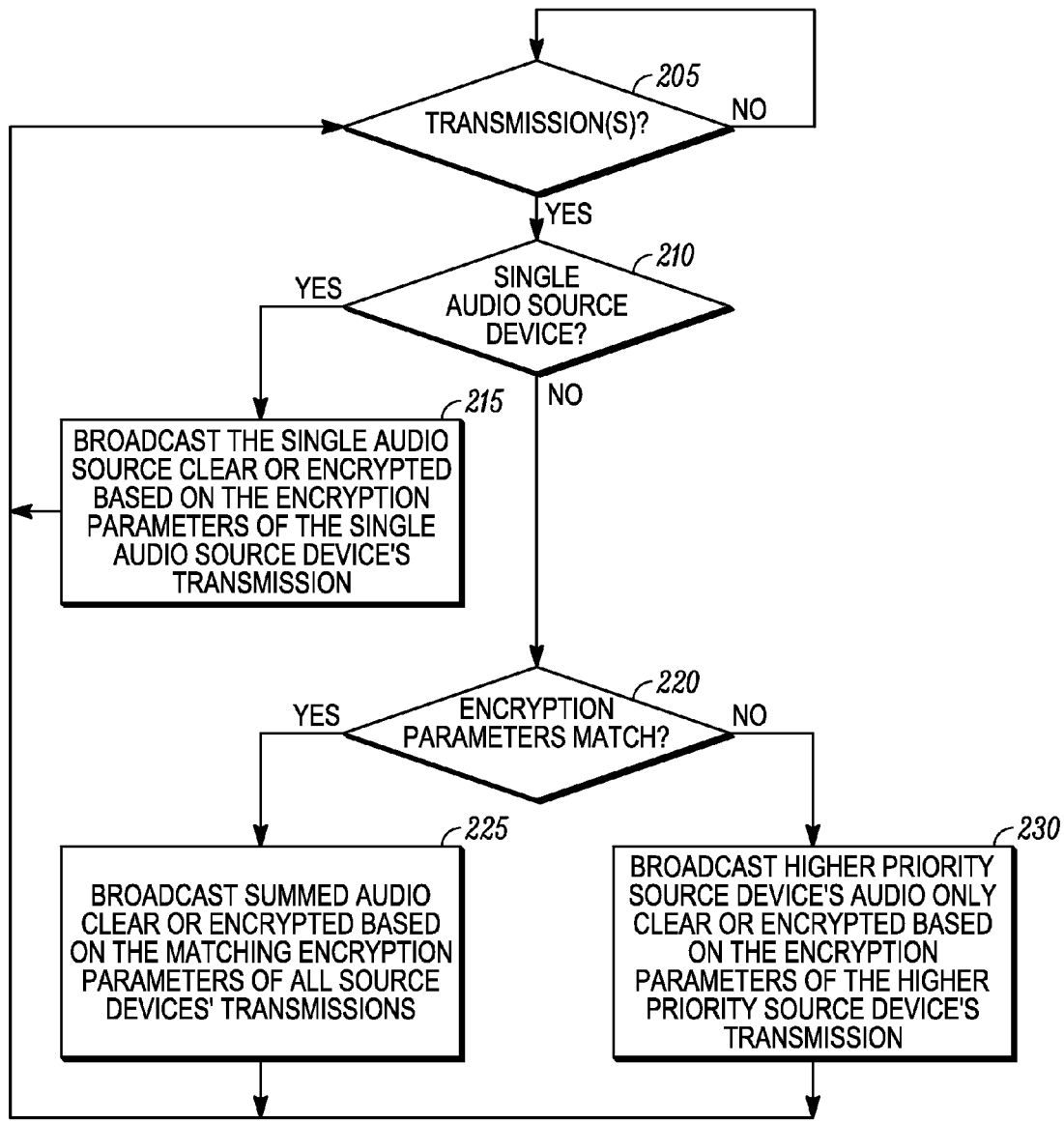
FIG. 2 is a flowchart of an audio summing method in accordance with some embodiments.

FIG. 2 is a flowchart of an audio summing method 200 in accordance with some embodiments. The audio summing method 200 contemplates operation in the radio communication system 100 such as on a summing processor 140 that is in or communicatively coupled to the infrastructure 110. The audio summing method 200 also contemplates operation in any general communication system. The audio summing method 200 initiates responsive to one or more received transmissions (step 205). The audio summing method 200 checks if there is a single audio source device (step 210), and if so, the audio summing method 200 causes the single audio source's transmission to be broadcast clear or encrypted based on an encryption parameters (e.g., mode, algorithm and key) of the single audio source device's transmission (step 215).

If there is not a single audio source device (step 210), the broadcast is from multiple source devices, and the audio summing method 200 checks if there is an encryption parameter match (mode, algorithm and key) between the multiple audio source devices' transmissions (step 220). The encryption parameter match means that the multiple audio source devices' transmissions are all either clear (i.e., no encryption) or encrypted using the same encryption algorithm and key. The encryption parameter mismatch means one of the multiple source devices' transmission being clear and another being encrypted or one of the multiple source devices' transmissions being encrypted using a different encryption algorithm or key than another one of the multiple source devices' encrypted transmission.

If there is an encryption parameter match (step 220), the audio summing method 200 causes the summed audio of the multiple audio source devices' transmissions to be broadcast clear or encrypted based on the matching encryption parameters of all source device transmissions (step 225). For example, the subscriber unit 120a and the dispatch console 130 are both transmitting concurrently and using the same encryption parameters. Here, the radio communication system 100 (e.g., via the summing processor 140) can sum the audio transmissions from the subscriber unit 120a and the dispatch console 130 and encrypt the resultant summed audio using the same encryption parameters as both source transmissions. The summed audio may be broadcast on a designated channel and/or talkgroup associated with the multiple source devices.

If there is an encryption parameter mismatch (step 220), the audio summing method 200 causes console audio only to be broadcast clear or encrypted based on the encryption parameters of the console audio transmission (step 230). Here, the subscriber unit 120a and the dispatch console 130 are concurrently transmitting, but using different encryption parameters. In this circumstance, the audio summing method 200 reverts back to giving the dispatch console 130 priority and preempts the subscriber unit 120a. This prevents initially encrypted audio from the lower priority source device from being broadcast in the clear, or encrypted audio from the lower priority source device from being broadcast using a different encryption algorithm and/or key.

The following table, Table I, illustrates the various rules embodied in the audio summing method 200 with reference to console audio (from the dispatch console 130) and subscriber audio (from the subscriber unit 120a). The table assumes three modes of communication—clear, encrypted with key K1, or encrypted with key K2. This example also assumes that the same encryption algorithm is being used for all encrypted calls. Of course, other modes are also contemplated with more or less encryption modes and keys.

TABLE I

Example Audio Summing Rules

| Console Audio | Subscriber Audio | Output Audio | Scenario |
|---|---|---|---|
| None | None | None | N/A |
| None | Clear | Clear Subscriber | single source |
| None | Encrypted (K2) | Encrypted (K2) Subscriber | single source |
| Clear | None | Clear Console | single source |
| Encrypted (K1) | None | Encrypted (K1) Console | single source |
| Clear | Clear | Clear Summed | encryption match |
| Encrypted (K1) | Encrypted (K1) | Encrypted (K1) Summed | encryption match |
| Clear | Encrypted (K2) | Clear Console | encryption mismatch |
| Encrypted (K1) | Clear | Encrypted (K1) Console | encryption mismatch |
| Encrypted (K1) | Encrypted (K2) | Encrypted (K1) Console | encryption mismatch |

The general rule is to sum the transmissions only when the sources share the same encryption parameters, and if not, to only cause the transmissions sourced from the dispatch console 130 to be broadcast using its associated encryption parameters. Also, the table can be adjusted to also include different encryption algorithms. Specifically, an encryption mismatch also occurs when the encryption algorithm is different (which also likely means the key is different as well). Thus, the above-referenced table also applies to encryption algorithm mismatches, but is shown with different keys K1, K2 in a same algorithm for illustration purposes.

Note, while the audio summing method 200 describes the resultant stream in cases of encryption mismatch as being the console only, i.e., console priority, the dispatch console 130 can still receive the transmission from the subscriber unit 120a, but this is not caused to be broadcast to the subscriber units 120b-120n. That is, in cases of encryption mismatch between the multiple source device transmissions, the audio summing method 200 can provide the resultant stream only from the dispatch console 130 transmission. Additionally, assume the dispatch console 130 is a first dispatch console and the radio communication system 100 includes another dispatch console, i.e., a second dispatch console. In this case, the resultant stream to the subscriber units 120b-120n is only from the first dispatch console. However, the second dispatch console can still hear both streams despite the encryption mismatch. Specifically, the second dispatch console, e.g., a second higher priority device, receives both streams while the resultant stream to the subscriber units 120b-120n is only from the first dispatch console.

An aspect of the audio summing method 200 is that the transmissions are consolidated in a single device and caused to be broadcast by the infrastructure with the appropriate summed audio and encryption parameters. In an exemplary embodiment, the audio summing method 200 is performed by the summing processor 140 which can be part of the infrastructure 110 or communicatively coupled thereto.

Again, the audio summing systems and methods provide rules governing the summing of audio in an encrypted voice system. The common audio sent to all subscriber units when both a sourcing console and sourcing subscriber unit are transmitting at the same time is governed by: i) sum together original audio streams when they are sourced in the same encryption parameters, i.e., a summed audio system, or ii) revert to Console Priority if the original sourced audio streams are in sourced in differing encryption parameters.

Advantageously, the audio summing systems and methods create a common resultant stream for all of the users that is delivered as a shared delivery signal (carrier over the air) to all subscriber units receiving the call. Other non-intended recipients may be listening on that medium, and should not hear audio that was not intended for them.

In an exemplary embodiment, a method in a wireless communication system for providing audio that is sourced from at least one of a dispatch console and a subscriber unit, to other subscriber units in the system includes receiving audio sourced by a dispatch console; receiving audio sourced by a subscriber unit; and creating a resultant audio stream for re-distribution to subscriber units. The resultant audio stream includes 1) the original sourced audio, if only one sourced audio stream exists and the resultant stream utilizes the encryption mode/algorithm/key of the original source; 2) a summation of console-sourced and subscriber-sourced audio if both audio streams are of the same encryption state (both unencrypted, or encrypted with same encryption algorithm and key) and the resultant stream utilizes the encryption mode/algorithm/key common to the original sourced audio streams; or 3) the original console-sourced audio if the console-sourced and subscriber-sourced audio are in different encryption states (different coded/clear mode, or both encrypted utilizing different encryption algorithms/keys) and the resultant audio stream utilizes the encryption mode/key of the original console-sourced audio stream. This resultant audio stream is delivered to the subscriber units such as via the infrastructure 110.

Figure 3:
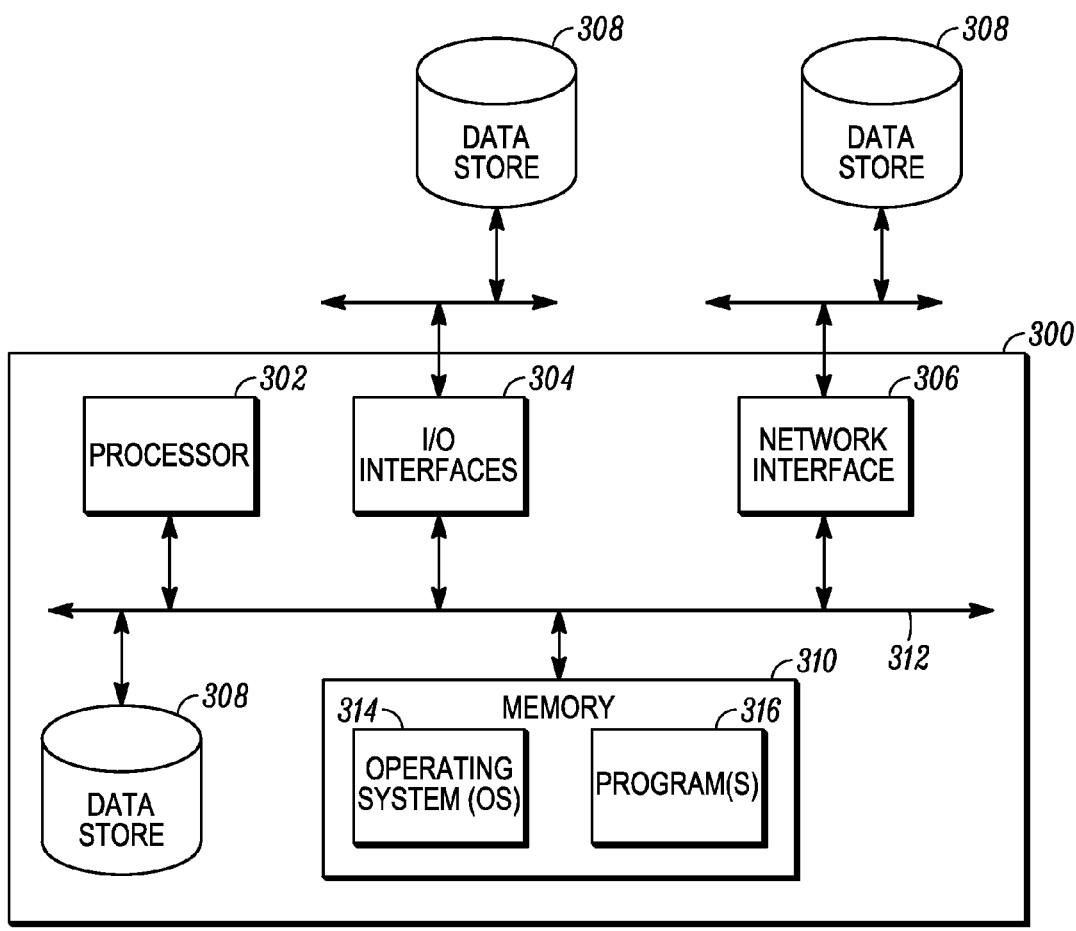
FIG. 3 is a block diagram of a device which may be used in the radio communication system of FIG. 1 for the summing processor in accordance with some embodiments.

FIG. 3 is a block diagram of a device 300 which may be used in the radio communication system 100 for the summing processor 140 in accordance with some embodiments. The device 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the device 300, a semiconductor-based microprocessor (in the form of a microchip or chip set), or generally any device for executing software instructions. When the device 300 is in operation, the processor 302 is configured to execute software stored within the memory 310, to communicate data to and from the memory 310, and to generally control operations of the device 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the device 300 to communicate on a network, such as the Internet, a wide area network (WAN), a local area network (LAN), and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the device 300 such as, for example, an internal hard drive connected to the local interface 312 in the device 300. Additionally in another embodiment, the data store 308 may be located external to the device 300 such as, for example, an external hard drive connected to the I/O interfaces 304 (e.g., SCSI or USB connection). In a further embodiment, the data store 308 may be connected to the device 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

In an exemplary embodiment, the device 300 includes instructions in the memory 310, such as one of the programs 316, that, when executed, cause the processor 302 to receive one or more transmissions from one or more source devices via the network interface 306; responsive to receiving a transmission from a single source device, cause the transmission to be broadcast either clear or encrypted based on the encryption parameters of the single source device's transmission, via the network interface 306; responsive to receiving multiple transmissions from multiple source devices, perform one of: cause a summed resultant stream of the multiple source device transmissions to be broadcast, via the network interface 306, either clear or encrypted based on an encryption match between the multiple source device transmissions; and cause a transmission received only from a higher priority source device of the multiple source devices to be broadcast, via the network interface 306, based on an encryption mismatch between the multiple source device transmissions, where the broadcast is transmitted based on associated encryption parameters of the higher priority device's transmission.

Figure 4:
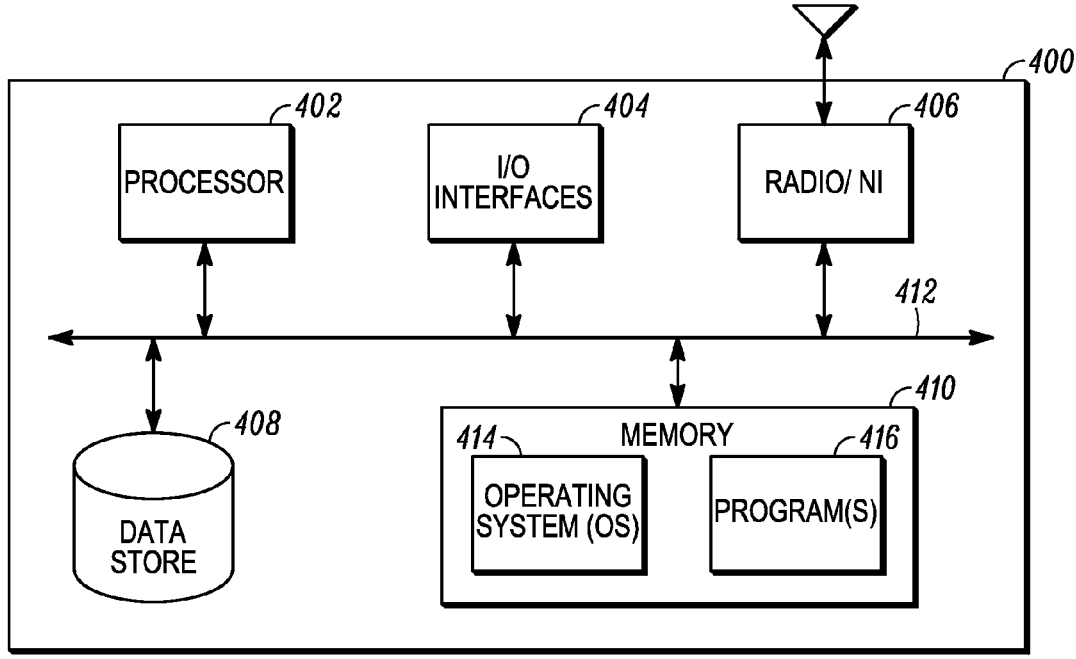
FIG. 4 is a block diagram of a device which may be used in the radio communication system of FIG. 1 for the subscriber units and/or the dispatch console.

FIG. 4 is a block diagram of a device 400 which may be used in the radio communication system 100 for the subscriber units 120 and/or the dispatch console 130. The device 400 can be a digital device that, in terms of hardware architecture, generally includes a processor 402, input/output (I/O) interfaces 404, a radio/network interface (NI) 406, a data store 408, and memory 410. It should be appreciated by those of ordinary skill in the art that FIG. 4 depicts the device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the device 400, a semiconductor-based microprocessor (in the form of a microchip or chip set), or generally any device for executing software instructions. When the device 400 is in operation, the processor 402 is configured to execute software stored within the memory 410, to communicate data to and from the memory 400, and to generally control operations of the device 400 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the memory 410. Additionally, the I/O interfaces 404 may further include an imaging device, i.e. camera, video camera, etc.

The radio/NI 406 enables wired and/or wireless communication to an external access device or network. Any number of suitable wireless data communication protocols, techniques, or methodologies can be supported by the radio/NI 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); Land Mobile Radio (LMR); Digital Mobile Radio (DMR); Terrestrial Trunked Radio (TETRA); Project 25 (P25); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. Note, the subscriber unit 120 typically will include wireless access via the radio/NI 406 based on any of the aforementioned techniques while the dispatch console 130 typically will include a wired interface similar to the network interface 306. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method in a communication system, the method comprising:
   receiving one or more concurrent transmissions from one or more source devices in the communication system;
   responsive to the one or more concurrent transmissions comprising a single source transmission from a single source device, retransmitting the single source transmission either clear or encrypted based on encryption parameters associated with the single source transmission;
   responsive to the one or more concurrent transmissions comprising multiple transmissions from multiple source devices:
      summing audio from each of the multiple transmissions to create a summed resultant stream and broadcasting the summed resultant stream that is either clear or encrypted when encryption parameters associated with each of the multiple transmissions match; and
      broadcasting only a selected transmission of the one or more concurrent transmissions from a higher priority source device of the multiple source devices when there is an encryption parameter mismatch between the multiple transmissions, wherein the selected transmission is broadcast either clear or encrypted based on encryption parameters associated with the selected transmission.

2. The method of claim 1, wherein the encryption parameters matching comprises each of the multiple transmissions being either clear or encrypted with a same encryption algorithm and key, and wherein the encryption parameter mismatch comprises one of the multiple transmissions being clear and another being encrypted or one of the multiple transmissions using a different encryption algorithm or key than others.

3. The method of claim 1, wherein the communication system comprises a radio communication system, and the receiving is at an infrastructure of the radio communication system and the broadcasting is from the infrastructure.

4. The method of claim 1, wherein the communication system comprises a dispatch system, and the higher priority source device comprises a dispatch console communicatively coupled to infrastructure of the communication system.

5. The method of claim 4, wherein the multiple source devices comprise the dispatch console and a subscriber unit.

6. The method of claim 4, wherein receiving the one or more concurrent transmissions comprises:
   receiving an audio transmission sourced by the dispatch console; and
   receiving an audio transmission sourced by a subscriber unit.

7. The method of claim 4, wherein the communication system comprises a summed audio system when there is an encryption parameter match and a console priority system when there is an encryption parameter mismatch.

8. The method of claim 1, further comprising:
   operating the communication system as a dispatch system with the higher priority device comprising a dispatch console; and
   operating as a console-priority system or a summed audio system based on a plurality of rules associated with encryption parameters of the multiple source devices.

9. The method of claim 1, wherein the communication system comprises one of Land Mobile Radio (LMR) and Long Term Evolution (LTE).

10. The method of claim 1, wherein the broadcasting is on a designated channel and/or talkgroup associated with the one or more source devices.

11. A device in a communication system, the device comprising:
   a network interface communicatively coupled to the communication system;
   a processor communicatively coupled to the network interface; and
   memory storing instructions that, when executed, cause the processor to:
      receive one or more concurrent transmissions from one or more sources via the network interface;
      responsive to the one or more concurrent transmissions comprising a single source transmission from a single source device, retransmit the single source transmission either clear or encrypted based on encryption parameters associated with the single source transmission; and
      responsive to the one or more concurrent transmissions comprising multiple transmissions from multiple source devices:
         sum audio from each of the multiple transmissions to create a summed resultant stream and broadcast the summed resultant stream that is either clear or encrypted when encryption parameters associated with each of the multiple transmissions match; and
         broadcast only a selected transmission of the one or more concurrent transmissions from a higher priority source device of the multiple source devices when there is an encryption parameter mismatch between the multiple transmissions, wherein the selected transmission is broadcast either clear or encrypted based on encryption parameters associated with the selected transmission.

12. The device of claim 11, wherein the encryption parameters matching comprises each of the multiple transmissions being either clear or encrypted with a same encryption algorithm and key, and wherein the encryption parameter mismatch comprises one of the multiple transmissions being clear and another being encrypted or one of the multiple transmissions using a different encryption algorithm or key than others.

13. The device of claim 11, wherein the communication system comprises a radio communication system, and the receiving is at an infrastructure of the radio communication system and the broadcast is from the infrastructure.

14. The device of claim 11, wherein the communication system comprises a dispatch system, and the higher priority source device comprises a dispatch console communicatively coupled to infrastructure of the communication system.

15. The device of claim 14, wherein the multiple source devices comprise the dispatch console and a subscriber unit.

16. The device of claim 14, wherein the communication system comprises a summed audio system when there is an encryption parameter match and a console priority system when there is an encryption parameter mismatch.

17. The device of claim 11, wherein the memory storing instructions that, when executed, further cause the processor to:
   operating the communication system as a dispatch system with the higher priority device comprising a dispatch console; and
   operating as a console-priority system or a summed audio system based on a plurality of rules associated with encryption parameters of the multiple source devices.

18. The device of claim 11, wherein the communication system comprises one of Land Mobile Radio (LMR) and Long Term Evolution (LTE).

19. The device of claim 11, wherein the broadcast is on a designated channel and/or talkgroup associated with the one or more source devices.

20. A communication system, the communication system comprising:
   a plurality of subscriber units;
   infrastructure communicatively coupled to the plurality of subscriber units;
   a console communicatively coupled to the infrastructure; and
   a device comprising a network interface communicatively coupled to the infrastructure, the console, a processor, and memory storing instructions that, when executed, cause the processor:
      receive a one or more concurrent transmissions from the console and/or a subscriber unit of the plurality of subscriber units;
      responsive to the one or more concurrent transmissions comprising a single source transmission from a single source device, retransmit the single source transmission either clear or encrypted based on encryption parameters associated with the single source transmission; and
      responsive to the one or more concurrent transmissions comprising multiple transmissions from multiple source devices:
         sum audio from each of the multiple transmissions to create a summed resultant stream and broadcast the summed resultant stream that is either clear or encrypted when encryption parameters associated with each of the multiple transmissions match; and
         broadcast only a selected transmission of the one or more concurrent transmissions from a higher priority source device of the multiple source devices when there is an encryption parameter mismatch between the multiple transmissions, wherein the selected transmission is broadcast either clear or encrypted based on encryption parameters associated with the selected transmission.

* * * * *